(12) United States Patent
Schaffer

(10) Patent No.: US 6,219,050 B1
(45) Date of Patent: *Apr. 17, 2001

(54) BOUNCE DIAGRAM: A USER INTERFACE FOR GRAPHICAL EXPLORATION OF PACKET TRACE INFORMATION

(75) Inventor: Stephen J. Schaffer, Foster City, CA (US)

(73) Assignee: Compuware Corporation, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,345

(22) Filed: Jul. 16, 1997

(51) Int. Cl.[7] ................. G09G 5/34; G06F 3/14
(52) U.S. Cl. ............ 345/340; 345/224; 345/356; 345/969
(58) Field of Search ................... 345/441, 440, 345/140, 329, 330, 331, 332, 969, 349, 709, 356, 340; 709/223, 224, 213, 214

(56) References Cited

U.S. PATENT DOCUMENTS

| | | | |
|---|---|---|---|
| 4,881,060 | * 11/1989 | Keen et al. | 340/511 |
| 5,193,151 | * 3/1993 | Jain | 709/239 |
| 5,394,522 | * 2/1995 | Sanchez-Frank et al. | 709/223 |
| 5,550,963 | * 8/1996 | Siegel et al. | 345/440 |
| 5,648,965 | * 7/1997 | Thadani et al. | 370/241 |
| 5,696,902 | * 12/1997 | Leclercq et al. | 709/223 |
| 5,751,965 | * 5/1998 | Mayo et al. | 709/224 |
| 5,867,483 | * 2/1999 | Ennis et al. | 370/252 |
| 5,898,431 | * 4/1999 | Webster et al. | 345/331 |
| 5,901,289 | * 5/1999 | Leonard | 709/224 |
| 5,995,113 | * 11/1999 | Mitchell et al. | 345/440 |
| 6,057,839 | * 5/2000 | Advani et al. | 345/341 |

FOREIGN PATENT DOCUMENTS 0 412 692 A1   2/1991   (EP) ................. H04M/3/36

OTHER PUBLICATIONS

International Search Report for International Application No. PCT/US98/14643, 4 pgs., Oct. 22, 1998.
Jander, M., "Hot off the Shelf: Application Management," Data Communications, vol. 25, No. 1, pp. 131–132, Jan. 1, 1996.

(List continued on next page.)

Primary Examiner—Raymond J. Bayerl
Assistant Examiner—Thomas J Joseph
(74) Attorney, Agent, or Firm—Blakely, Sokoloff, Taylor & Zafman

(57) ABSTRACT

A user interface for a protocol analyzer or similar network management software product provides a graphical representation of the behavior of packets in a packet trace with respect to time, graphically showing a transmission time, source node and destination node. In a preferred implementation, the user interface, called a "bounce diagram," contains a time axis, and a number of node lines parallel thereto, each node line associated with a node label for a node in the packet trace. Each packet in the packet trace is represented by a packet arrow which extends from a node line for the source node to a node line for the destination node of the packet. The packet arrow is preferably color coded to indicate the size of the packet. Preferably, there is a packet density graph which indicates in each time interval a number or percentage of packets of the packet trace transmitted during the time interval. The packet density graph may be color coded to indicate the average size of packets during each time interval. The bounce diagram is interactive and responds to a user selection of a packet arrow by displaying a pop-up window with the packet size, source and destination node addresses, transmission time, and protocol decodes for the packet. The user may also zoom in and out of the diagram by selecting an area thereof, with the diagram automatically rescaling the time axis to correspond to the time within the selected area.

16 Claims, 10 Drawing Sheets

OTHER PUBLICATIONS

Mansfield, G., Murata, M., Higuchi, K., Jayanthi, K., Chakraborty, B., Nemoto, Y., Noguchi, S., "Network Management in a Large–Scale OSI–Based Campus Network using SNMP," Discovering a New World of Communications, SUPERCOMM/International Conference on Communications '92, vol. 1, pp. 179–185, Jun. 14, 1992.

Mansfield, G., Murata, M., Higuchi, K., Jayanthi, K., Chakraborty, B., Nemoto, Y., Noguchi, S., "Network Management in a Large–Scale OSI–based Campus Network," IEEE 1992 Network Operations and Management Symposium, vol. 2, pp. 566–578, Jan. 1, 1992.

Scott, K., "Taking Care of Business with SNMP," Data Communications, vol. 19, No. 4, pp. 31–41, Mar. 21, 1990.

Booch, G., and Rumbaugh, J., "Notation Summary Version 0.8", Unified Method for Object–Oriented Development Documentation Set Version 0.8, pp. 2,24, and 26, 1995.

Stevens, W. R., "TCP/IP Illustrated", vol. 1 Chapter 19, Section 19.4, p. 271, 1994.

Tanenbaum, A. S., "Computer Networks, Second Edition", Chapter 2, Section 2.5, p. 88, Chapter 5, Section 5.5, p. 352, 1989.

\* cited by examiner

FIG. 1

Packet Trace: Task 1: Customer Call

| | Relative Time | Bytes | Source Node | Destination Node | Description: |
|---|---|---|---|---|---|
| 1 | 0.0198 | 60 | Client | Application Server | IP D=[199.99.127.150]S=[199.99.127.151]LEN=24 ID=55336 |
| 2 | 0.0202 | 82 | Client | Application Server | IP D=[199.99.127.150]S=[199.99.127.151]LEN=48 ID=55592 |
| 3 | 0.0205 | 60 | Application Server | Client | IP D=[199.99.127.151]S=[199.99.127.150]LEN=20 ID=26537 |
| 4 | 0.0527 | 60 | Client | Application Server | IP D=[199.99.127.150]S=[199.99.127.151]LEN=21 ID=55848 |
| 5 | 0.0530 | 60 | Client | Application Server | IP D=[199.99.127.150]S=[199.99.127.151]LEN=21 ID=56104 |
| 6 | 0.0533 | 60 | Client | Application Server | IP D=[199.99.127.150]S=[199.99.127.151]LEN=21 ID=56360 |
| 7 | 0.0534 | 60 | Application Server | Client | IP D=[199.99.127.151]S=[199.99.127.150]LEN=20 ID=26793 |
| 8 | 0.0537 | 60 | Client | Application Server | IP D=[199.99.127.150]S=[199.99.127.151]LEN=21 ID=56616 |
| 9 | 0.0540 | 60 | Application Server | Client | IP D=[199.99.127.151]S=[199.99.127.150]LEN=20 ID=27049 |
| 10 | 0.0541 | 60 | Client | Application Server | IP D=[199.99.127.150]S=[199.99.127.151]LEN=21 ID=56872 |
| 11 | 0.0545 | 60 | Client | Application Server | IP D=[199.99.127.150]S=[199.99.127.151]LEN=21 ID=57128 |
| 12 | 0.0548 | 60 | Application Server | Client | IP D=[199.99.127.151]S=[199.99.127.150]LEN=20 ID=27305 |
| 13 | 0.0549 | 60 | Client | Application Server | IP D=[199.99.127.150]S=[199.99.127.151]LEN=21 ID=57384 |
| 14 | 0.0563 | 60 | Client | Application Server | IP D=[199.99.127.150]S=[199.99.127.151]LEN=21 ID=57640 |
| 15 | 0.0570 | 60 | Client | Application Server | IP D=[199.99.127.150]S=[199.99.127.151]LEN=21 ID=57896 |
| 16 | 0.0571 | 60 | Application Server | Client | IP D=[199.99.127.151]S=[199.99.127.150]LEN=20 ID=27561 |
| 17 | 0.0573 | 60 | Client | Application Server | IP D=[199.99.127.150]S=[199.99.127.151]LEN=21 ID=58152 |

BOUNCE DIAGRAM: A USER INTERFACE FOR GRAPHICAL EXPLORATION OF PACKET TRACE INFORMATION

BACKGROUND

1. Field of Invention

The present invention relates generally to the field of network management software products, and more particularly, to the field of user interfaces for network protocol analyzers.

2. Background of the Invention

As computer networking has exploded throughout the past decade, network protocol analyzers have become useful software products for capturing, analyzing and displaying information about packets that are transmitted over a network. A protocol analyzer typically has the capability to promiscuously capture packets (frames) generated by other stations (nodes) on the network, decode each packet into a meaningful description, and then display lists of these packets in the sequence in which they were captured from the network. The data that can be displayed with each frame typically includes:

- a time at which the packet was captured, relative to some reference time, such as the time for one of the packets, where the time is either determined from a system clock, or the delta time between successive packets;
- a length of the packet, in bytes;
- one or more source node addresses, at one or more protocol layers (e.g. a TCP/IP packet on an ethernet would have both an ethernet and IP address of the source station);
- one or more destination node addresses, again optionally at multiple protocol layers; and
- a set of protocol decodes, preferably at each layer that the protocol analyzer is capable of decoding.

In conventional network analyzers, this information for a packet trace is displayed to the user in a packet trace table. FIG. 1 illustrates a conventional packet trace table. The table includes a sequential list of packets, one packet per row, with columns for time, source and destination addresses, length, and the protocol decodes. The table is quite understandable to a network professional who understands the protocols and is tasked with solving network protocol and network device problems.

The maturation and standardization of networking protocols as well as the availability of cheaper, more powerful desktop, laptop and server computers has facilitated the migration from mainframe applications to distributed applications. As distributed applications are developed and deployed there is often the need to understand their network behavior.

Cases where an application's network behavior must be understood include troubleshooting poor performance of the application, determining how the application can be "tuned" to improve response time or increase network efficiency, and profiling the application to determine its impact on the network. A protocol analyzer is used in these situations because of its ability to capture and display the packets that the application sends over the network. However, the packet trace table displayed by conventional protocol analyzers makes it difficult to understand the overall traffic patterns over time.

For example, troubleshooting slow response time of an application may be difficult with a packet trace display. The significant delays in the sequence are not easily located. The user must scroll through the entire table, which may contain thousands or tens of thousands of rows, searching for a large time gap between a pair of adjacent packets. Tuning an application to improve its response time is difficult with a packet trace table for a similar reason, however in this case the additive effect of a number of smaller gaps is what is being identified. Often the resulting analysis is a tedious and time consuming manual identification and addition of the gaps.

Tuning an application to increase its network efficiency is also cumbersome when a packet trace table is displayed as a sequential list of packets. Particularly in multi-tier applications (applications where the client communicates with one server, which in turn communicates with another server, and so on) and multi-server applications (where the client communicates with multiple servers) it is difficult to quickly understand the source and destination of a packet.

Accordingly, it is desirable to provide a user interface for a protocol analyzer that makes the display of time based behavior of network packet traffic easy to understand, and thereby supports improved analysis of such behaviors.

SUMMARY OF THE INVENTION

The present invention overcomes the limitations of conventional user interfaces for protocol analyzers by providing a fully graphical, interactive diagram that displays both the time relationship between packets and the source and destination nodes of each packet. The user interface of the present invention is referred to herein as a "bounce diagram".

A bounce diagram is a way of displaying packet trace information that preserves the time spacing of the sequence of packets ("packet trace"). In one embodiment, a bounce diagram includes a time axis divided into a number of time intervals. Each source or destination node that occurs in the packet trace is represented by a node line, which is parallel to the time axis, the various node lines spaced apart from each other. A node label is displayed at the beginning of each node line. Each packet in the packet trace is transmitted from a source node to a destination node. Each packet is then represented by a packet arrow, an arrowed line that extends from a node line for the packet's source node to the node line for the packet's destination node. The packet arrow is positioned relative to the time axis at a point that is proportional to the relative time at which the packet was sent by the source node to the destination node over the network.

In one preferred embodiment, each packet arrow is color coded (or otherwise visually distinguished) to indicate its size, preferably using a distinct color for each of a range of sizes (e.g. red for less than 100 bytes, pink for 100 to 512 bytes, and so forth). This color coding enables the user to immediately perceive the size variations in a stream of packets.

As an additional feature of the present invention, a bounce diagram may also include a packet density graph in each time interval. The packet density graph visually indicates, for example, using a bar chart, a percentage (or number) of all packets in the packet trace that occurred in the time interval. For example, if the entire bounce diagram spanned 5 seconds, with 1 second time intervals, and 1000 packets were transmitted in the 5 second period, with 50 packets the first second, 200 packets the next, 400 packets the third, 200 packets in the fourth interval, and 150 in the fifth interval, then the packet density graph would show 5%, 20%, 40%, 20%, and 15% of packets in the first through fifth time intervals. The packet density graph for the third time interval (40%) would be the largest in size or area, and scaled to represent 40% of the packets in the packet trace, relative to a scale for the packet density graph. Additionally, each packet density graph may also be color coded with the average (mean, median, or mode) packet size of packets in the associated time interval.

In the preferred embodiment, the bounce diagram is interactive. The user may move a mouse over a packet arrow to select the packet arrow, in response to which a pop-up window is shown detailing the underlying packet information for the packet, including the precise time, size, source and destination nodes, and protocol decodes for the packet.

Also, the user may zoom in on a region of the diagram, which increases the resolution of the time axis, and shows the individual packet arrows more discretely. Zooming is achieved by the user selecting an area of the bounce diagram between a starting and ending time. The bounce diagram is automatically redisplayed so that the visible portion of time axis corresponds to the time period between the starting and ending times. The packet arrows for packets transmitted in this time interval are likewise displayed with respect to the node lines.

The packet density graphs update accordingly to the size of the time intervals at the resulting resolution. In this way the user can easily view the packet trace at any level of detail from a view of the entire sequence to a view of a fraction of the sequence which shows the behavior of individual packets.

Finally, node processing lines may be overlaid on top of the node lines during the time periods each node is in control of communication, when it is processing data or idle. The node processing lines indicate to the user visually which nodes are responsible for response times.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 1 is an illustration of a conventional packet trace table.

DETAILED DESCRIPTION OF THE PREFERRED EMBODIMENT

Figure 2:
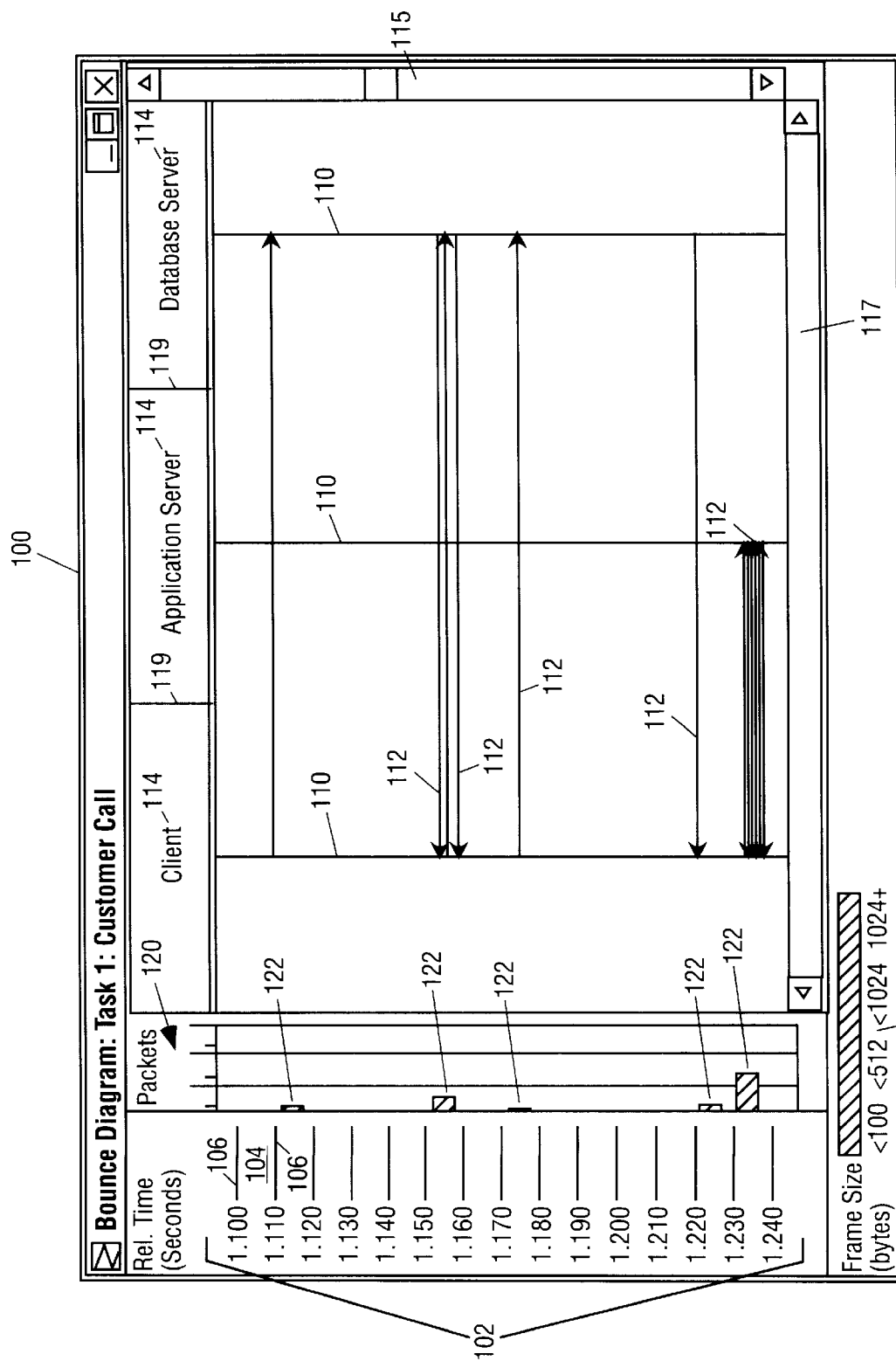
FIG. 2 is an illustration of a bounce diagram.

Referring now to FIG. 2 there is shown an illustration of a bounce diagram 100 in accordance with a preferred embodiment of the present invention. In its basic form, the bounce diagram 100 includes a time axis 102, a plurality of node labels 114 and node lines 110, and a plurality of packet arrows 112. The time axis 102 illustrates a time period for which the packet trace data is displayed. The time period is preferably in relative time, using as a zero reference time the time value of an arbitrarily selected event, such as a first packet in a sequence of packets, even a subsequent packet (resulting in negative relative times for prior packets. The time axis 102 is segmented into a plurality of time intervals 104, each time interval 104 between two times 106. Each time 106 may be represented by a drawn line, as shown.

A set of node addresses is extracted from all packets in the packet trace. These node addresses (or representative node names) are displayed as node labels 114, arranged perpendicular to the time axis 102. Extending from each node label 114, and drawn parallel to the time axis 102, is a single node line 110. These features provide the basic structure into which the packet information, in the form of packet arrows 112, is displayed. The distance between the node lines 110 may be adjusted by the user by moving the boundary markers 119 between each node label 114 to increase or decrease the width of each node label 114.

The bounce diagram 100 of FIG. 2 is shown with the time axis 102 and node lines 110 vertically drawn, the node labels 114 listed horizontally; however, the relative positions of these features may be swapped without loss of information, so that the time axis 102 and node lines 110 may be drawn horizontally, the node labels 114 listed vertically. In this description, the use of the terms "vertical" and "horizontal" is therefore understood to refer merely to the illustrated embodiment of the bounce diagram 100.

For each packet in the packet trace, there is a packet arrow 112. Each packet arrow 112 is a single line with an arrowhead extending from the node line 110 of the source node ('source node line') of the packet to the node line 112 for the destination node of the packet ('destination node line'). The vertical position of the beginning of a packet arrow 112 corresponds on the time axis 102 to the time the packet was sent by its source node ('start time'); the vertical position of the end of a packet arrow corresponds to the time the packet was received by its destination node ('receipt time'). Where the receipt time is not available, it is assumed equal to the start time, resulting then in horizontal packet arrows 112, as shown in FIG. 2. If the receipt time is available, then the packet arrows 112 will slope down from the source node line 110 to the destination node line 110.

Where there are many packets sent/received within a very small time interval 104, the packet arrows 112 may overlap, producing a very thick and crowded display of packet arrows, as in the group of packet arrows 112 between 1.23 and 1.24 seconds, or the appearance of double sided packet arrows 112. Where multiple packet arrows 112 overlap, the subsequent packet arrows 112 are displayed on top of the earlier packet arrows 112.

In the preferred embodiment, each packet arrow 112 is color coded, and drawn in a color that represents the size of the packet. Each color is associated with a range of packet sizes. Preferably, four size range-color combinations are used: red (size<100 bytes), pink (100<=size<512), green (512<=size<1024) and blue (size>=1024 bytes). A packet size legend 124 shows the color coding for the packet arrows 112. Additional larger or smaller number size ranges, and other colors may be used. Instead of color coding for the packet arrows 112, various line styles, such as dashed, dotted, and the like, may be used for the packet arrows 112 to indicate the different sizes of the packets.

To view packet arrows before or after the time period visible on time axis 102, the user may scroll vertically using the vertical scroll bar 115. To view node labels 114 for other nodes, the user may scroll horizontally using the horizontal scroll bar 117.

With just the foregoing features of the bounce diagram 100, the user is able to immediately and easily see the time based behavior of the packets in a packet sequence. Gaps in the time intervals between packets or groups of packets become readily apparent, as well as the density of packets per time interval. The user can readily determine the relative amounts of time and quantities of packets that are transmitted between the various nodes, which is particularly helpful in analyzing network behavior, as further explained below.

In a preferred embodiment, the bounce diagram 100 includes a packet density graph 120. The packet density graph 120 is a portion of the diagram in which graphically indicates the number of packets in each time interval 104 of the time axis 102, relative to a total number of packets in the packet trace. The graphical representation is preferably a bar chart, here called a packet density bar 122. Each packet density bar's horizontal extent is proportional to the number of packets within the corresponding time interval, relative to the total number of packets in the time period for the entire packet trace. Each packet density bar 122 is drawn with respect to a packet density scale 126. The packet density scale 126 is preferably logarithmic, for example from 0.1 to 100% at selected horizontal positions.

For example, in FIG. 2, fourteen 0.01 second time intervals 104 are shown, but only some of these have packet density bars 122, as no packet density bar 122 is needed where no packets were transmitted in a time interval 104. The first (top most) packet density bar 122 shows that about 0.15% of the packets in the packet trace occurred in the time interval 104 between 1.11 and 1.12 seconds. The next packet density bar 122 shows that a larger percentage, about 0.46% of the packets in the packet trace occurred in the time interval 104 between 1.15 and 1.16 seconds. The last packet density bar 122 shows that about 2.61% of the packets in the packet trace occurred in the time interval 104 between 1.23 and 1.24 seconds.

In addition, each packet density bar 122 may also be color coded to show the average size of packets in the corresponding time interval 104. The average may be determined as either the mean, median (the size of middle packet in time interval 104), or mode size. The color of the packet density bar 1262 need not be the same color as the packet arrows 110 in the same time interval 104 as displayed. This results from the overlapping of later packet arrows 112 of earlier packet arrows 112, where the later packet arrows 112 are for packets of a different size then a larger number of earlier packets.

FIG. 2 illustrates the packet density bars 122 extending perpendicular to the time axis 102. This is desirable because it allows for direct visual comparison of various packet density bars 122 for different time intervals relative to a common axis. Extending the bars vertically would hinder this comparison effect.

The underlying packet information used to construct the bounce diagram 100 is available using conventional packet capture technology, including conventional protocol analyzers. In the preferred embodiment, the packet capture is provided as a part of Optimal Network Corp.'s Application Expert software product, though other protocol analyzers may also be used.

The bounce diagrams 100 of the present invention provide various interactive features when displayed on a computer screen, which further enhance the user's ability to analyze network application behavior. The user can interact with the bounce diagram 100 through a keyboard, mouse, or other pointing device.

Figure 3:
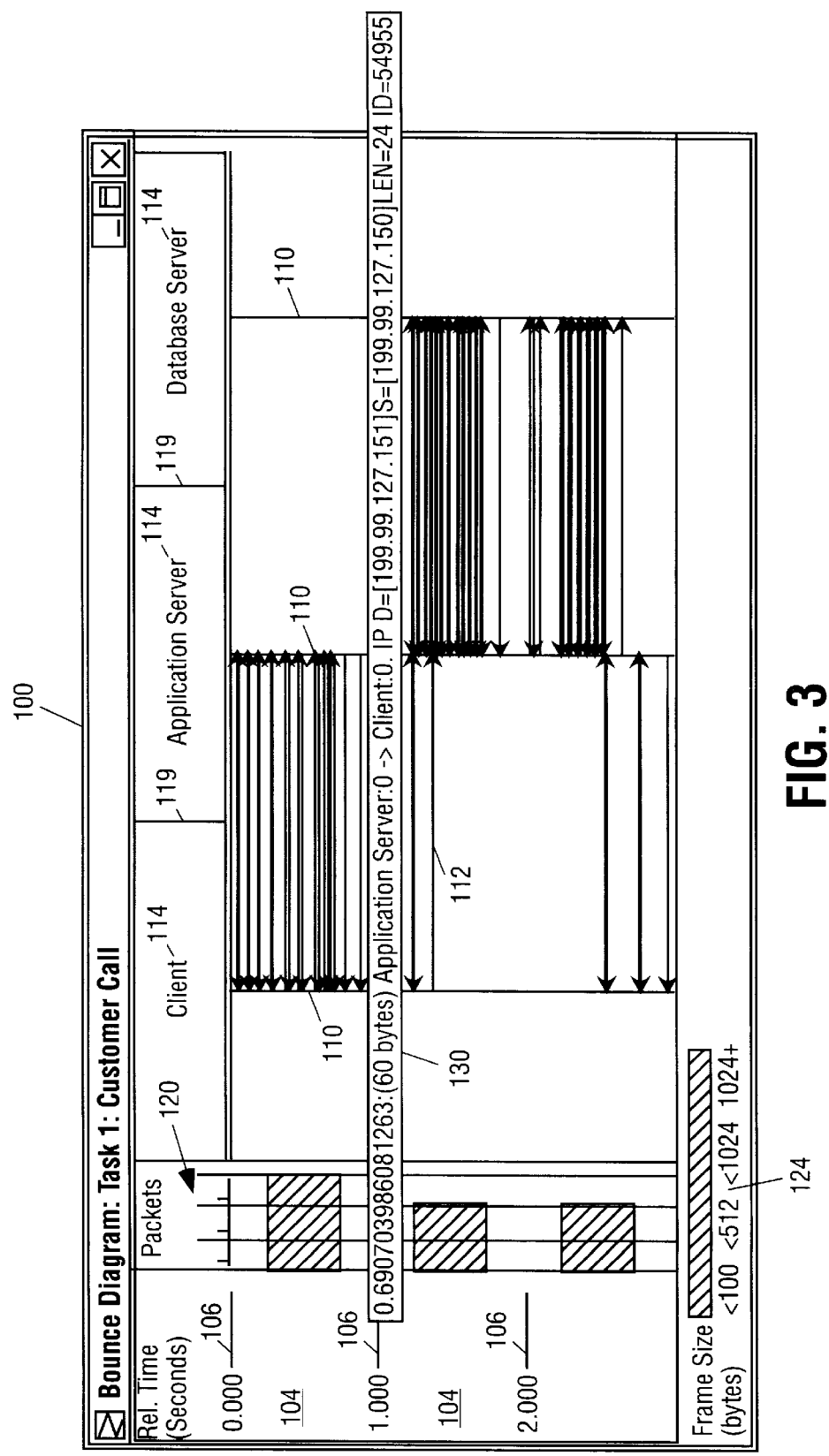
FIG. 3 is an illustration of a bounce diagram showing detail pop-up window.

Referring to FIG. 3, when a user selects a packet arrow 112 by positioning the mouse or other pointing device over the packet arrow 112 for a certain duration of time, a packet detail pop-up window 130 is displayed near the packet arrow 112. The packet detail pop-up window 130 includes detailed information for the packet. In the preferred embodiment, the detailed information is formatted as follows:

<time>: (<size> bytes) <source node>:<source port>→<destination node>:<destination port>. <decode> where:

<time>—relative time of the packet;

<size>—size of the packet, in bytes;

<source node>—name of the source node corresponding to one of the node labels 114;

<source port>—port number at the source node, for IP and IPX packets;

<destination node>—name of the destination node, corresponding to one of the node labels 114;

<destination port>—port number at the destination node; and

<decode>—a detailed protocol decode of the packet.

Figure 4:
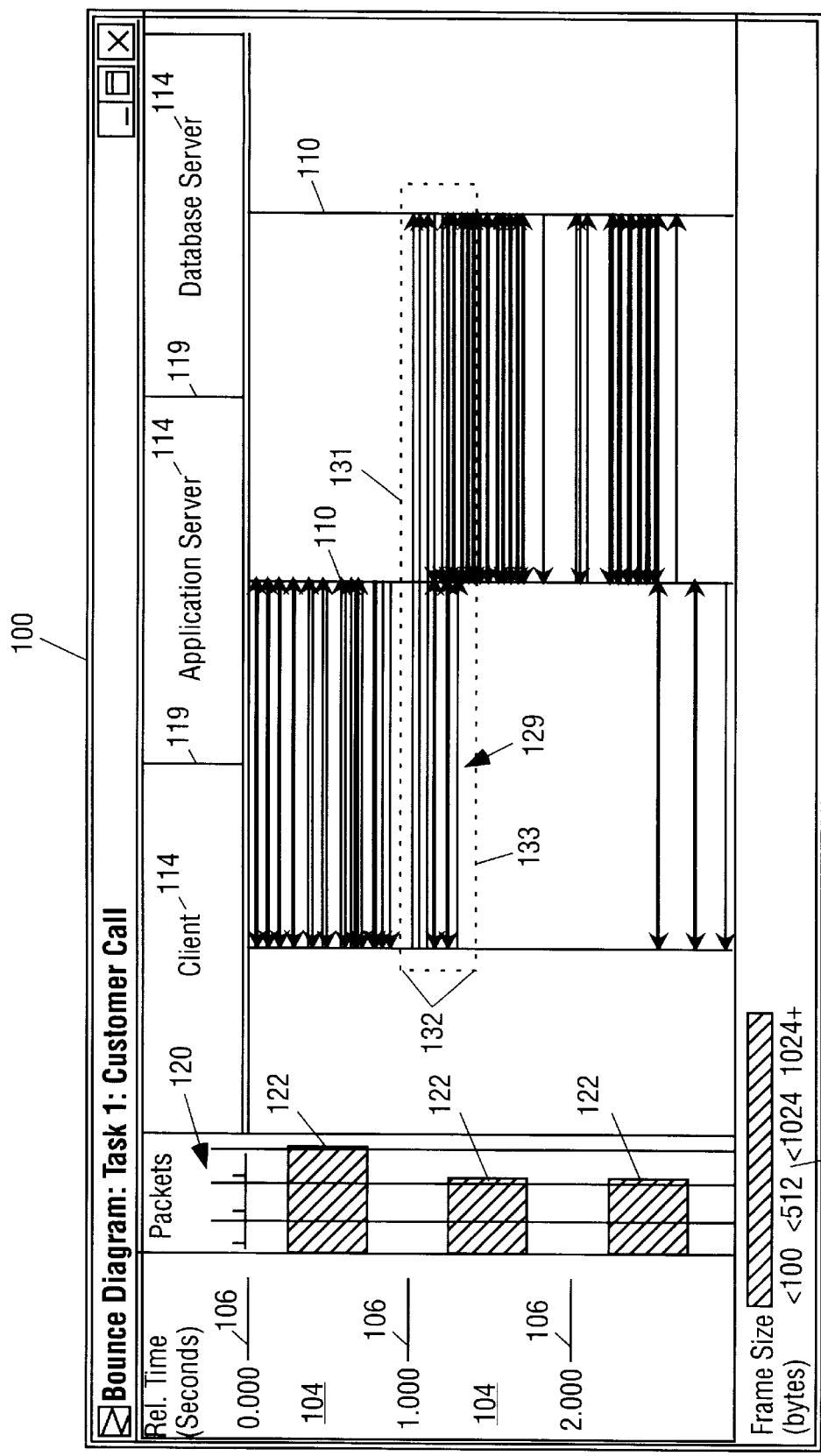
FIG. 4 is an illustration of a bounce diagram during selection of an area to be zoomed.
Figure 5:
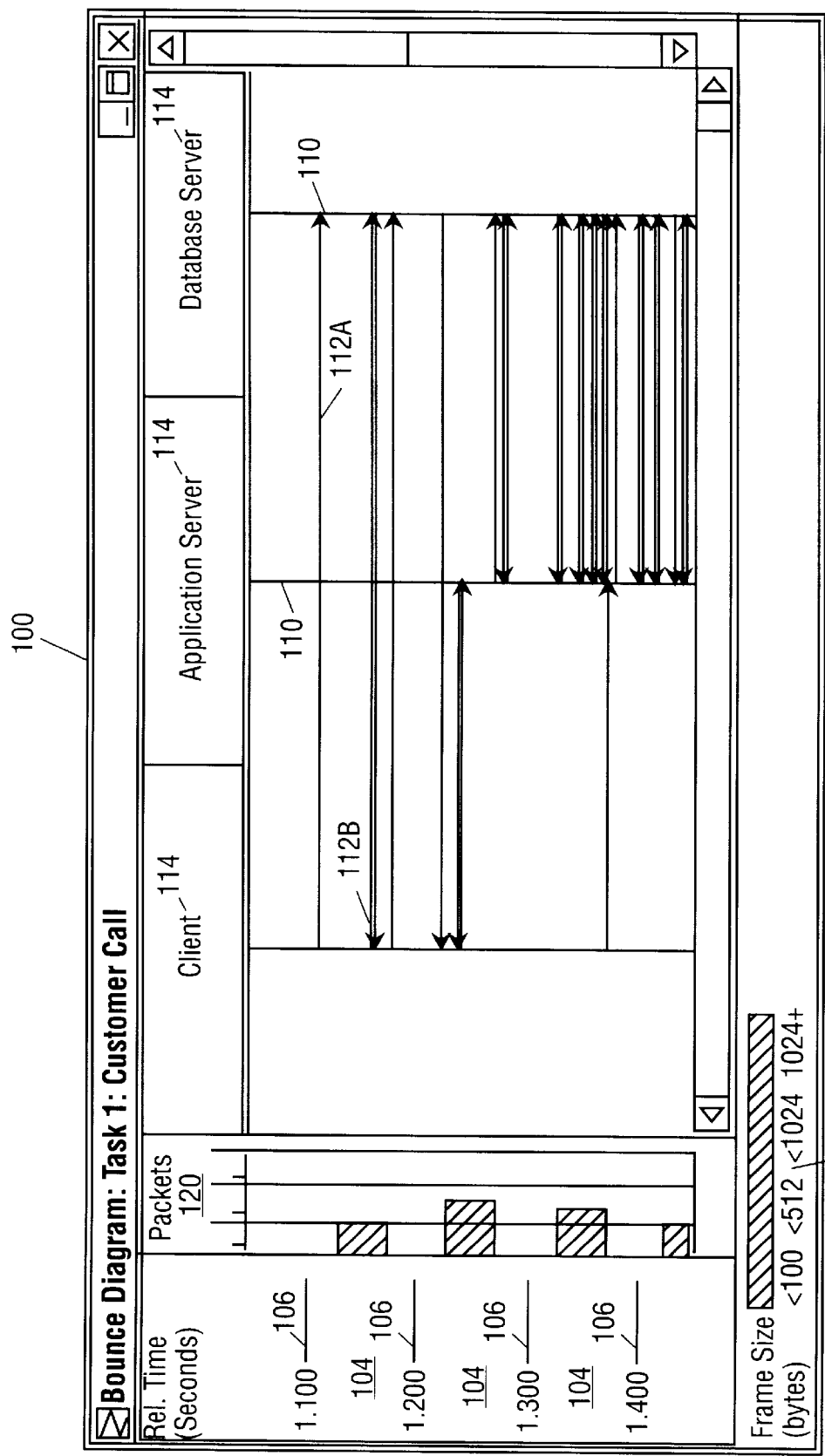
FIG. 5 is an illustration of the bounce diagram of FIG. 4 showing the zoomed area.

Referring to FIGS. 4 and 5, there is shown an example of zooming. Zooming enables the user to increase the time resolution of the time axis 102 so that the time intervals 104 correspond to smaller time periods, thereby showing the packets during such intervals more clearly. Zooming is useful in order to observe network communication first at a high level, and then move to increasing finer levels of detail.

In FIG. 4, there is shown a bounce diagram 100 of a three-tier application, where the application is comprised of a client, a database server, and an application server. The bounce diagram 100 shows the initial communication between the client and the application server at the beginning, followed by a brief communication between the client and database server, followed by a number of packets between the application server and the database server. This view of the packet trace allows the user to quickly understand the way the conversation between the three nodes progresses over time.

The user can use zooming to investigate the behavior of the application at the point where the client begins to communicate with the database server. In FIG. 4, the user has dragged a selection rectangle 132 over a selected area 129 of the bounce diagram 100. The selected area 129 extends from a starting time to an ending time. The starting time corresponds to the top edge 131 of the selected area 129 relative to the time axis, and the ending time corresponds to the bottom edge 133 of the selected area 129 relative to the time axis. In FIG. 4, the starting time is about 1.1 seconds, and the ending time is about 1.4 seconds. This area 129 corresponds the particular packets of interest to the user.

When mouse button is released, the bounce diagram 100 redraws to display in the visible area of the window only the time range (1.1 to 1.4 seconds) that was in the selected area 129. The resulting bounce diagram 100 is shown in FIG. 5. FIG. 5 shows that the visible portion of the time axis 102 extends from the starting time of 1.1 seconds to the ending time of 1.4 seconds. This time period on the time axis 102 is automatically divided into a number of time intervals 104 which are labeled for the user's convenience. The packet arrows 112 for the individual packets during this time period are now more clearly visible in each the time intervals 104. The remainder of the packet trace before and after the starting and ending times, may be viewed by scrolling up or down in the window. In addition, the packet density graph 120 has been updated to reflect an average number of packets in the now smaller time intervals 104.

With this zoomed view of the bounce diagram 100, it is easier for the user to see the time gap between the client sending a packet to the database server, as shown by packet arrow 112a and the response being returned to the client, as shown by packet arrow 112b. Also in this view of the bounce diagram 100 it is easy to see the sequence of application functionality. After the exchange between the client and database server, the client and application server exchange a sequence of packets, and then the application server and database server enter into an exchange of packets. Functionality is also provided to allow the user to navigate back to prior displayed bounce diagrams 100 and to the entire duration of the trace.

As a bounce diagram 100 and a packet trace table are alternate representations of the same underlying information, the present invention enables the user to move from a bounce diagram 100 to a portion of a packet trace table detailing the information for the packets represented in the bounce diagram 100. Similarly, a menu command may be used by the user to select a row for a packet in a packet trace table, and then display the packet arrow 112 for the select packet in a bounce diagram 100.

Figure 6:
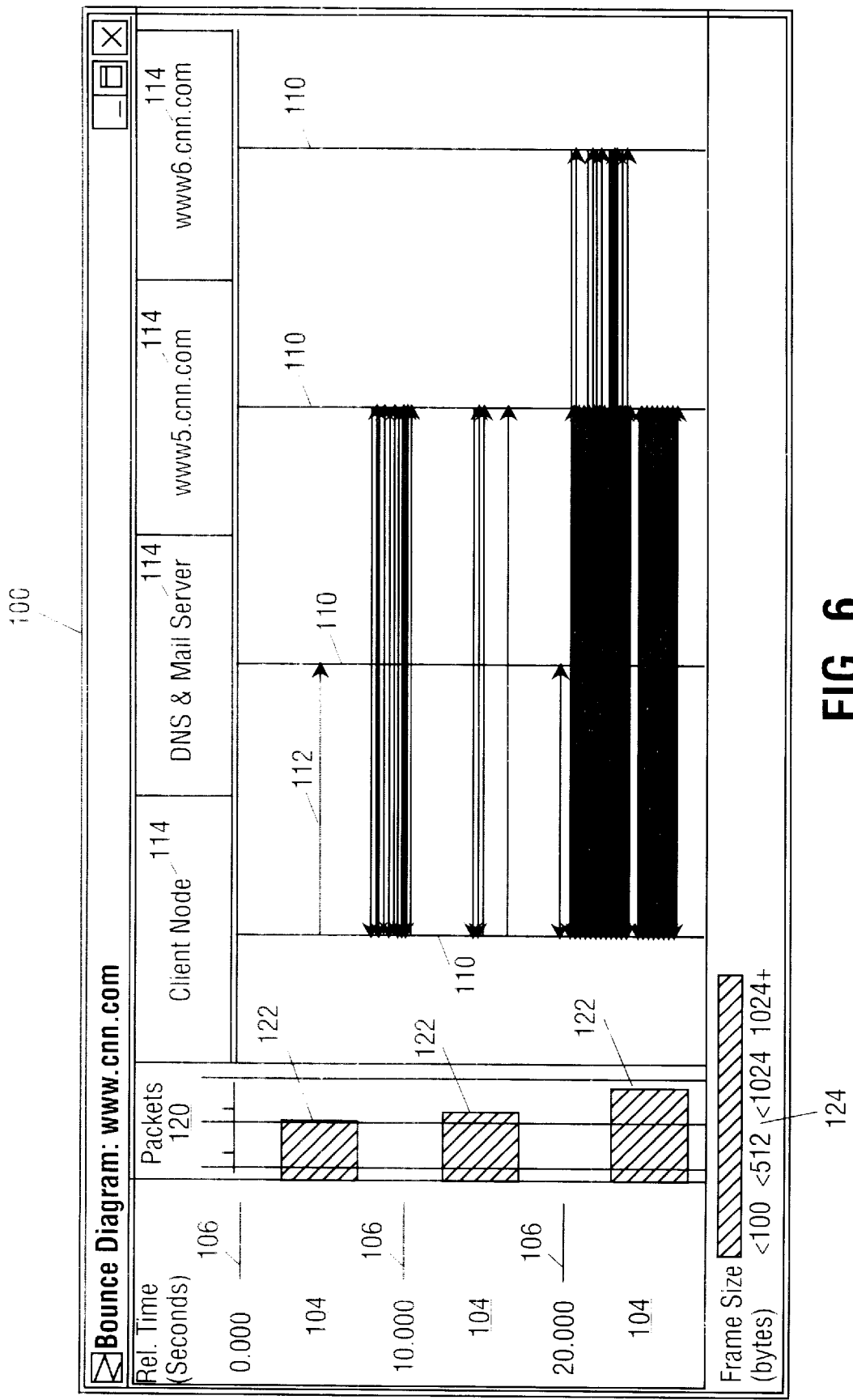
FIG. 6 is an illustration of a bounce diagram showing time gaps in application response time.

The bounce diagrams 100 of the present invention may be used for various types of analysis. The analysis of a multi-tier application was described with respect to FIGS. 4 and 5. As another example, the bounce diagrams 100 may be used to debug application response time problems. In FIG. 6, there is shown the bounce diagram 100 of a packet trace for a client node in communication with a DNS (domain name server) & Mail Server, and various Internet nodes. The bounce diagram 100 clearly reveals that there are several large time gaps that translate into increased response time for the user of the application. The first two large time gaps appear between the client node and the DNS & Mail Server at a time range between 0.0 and approximately 8.0 seconds. These gaps show that the client is delaying after sending packets to the DNS & Mail Server while it appears to be waiting for a response. The bounce diagram 100 immediately makes these large idle periods visible, thereby enabling the user, such as an applications developer, to more quickly determine the potential causes of such delays between the packets. In addition, this bounce diagram 100 reveals how the client node communicates with different servers over time.

Figure 7:
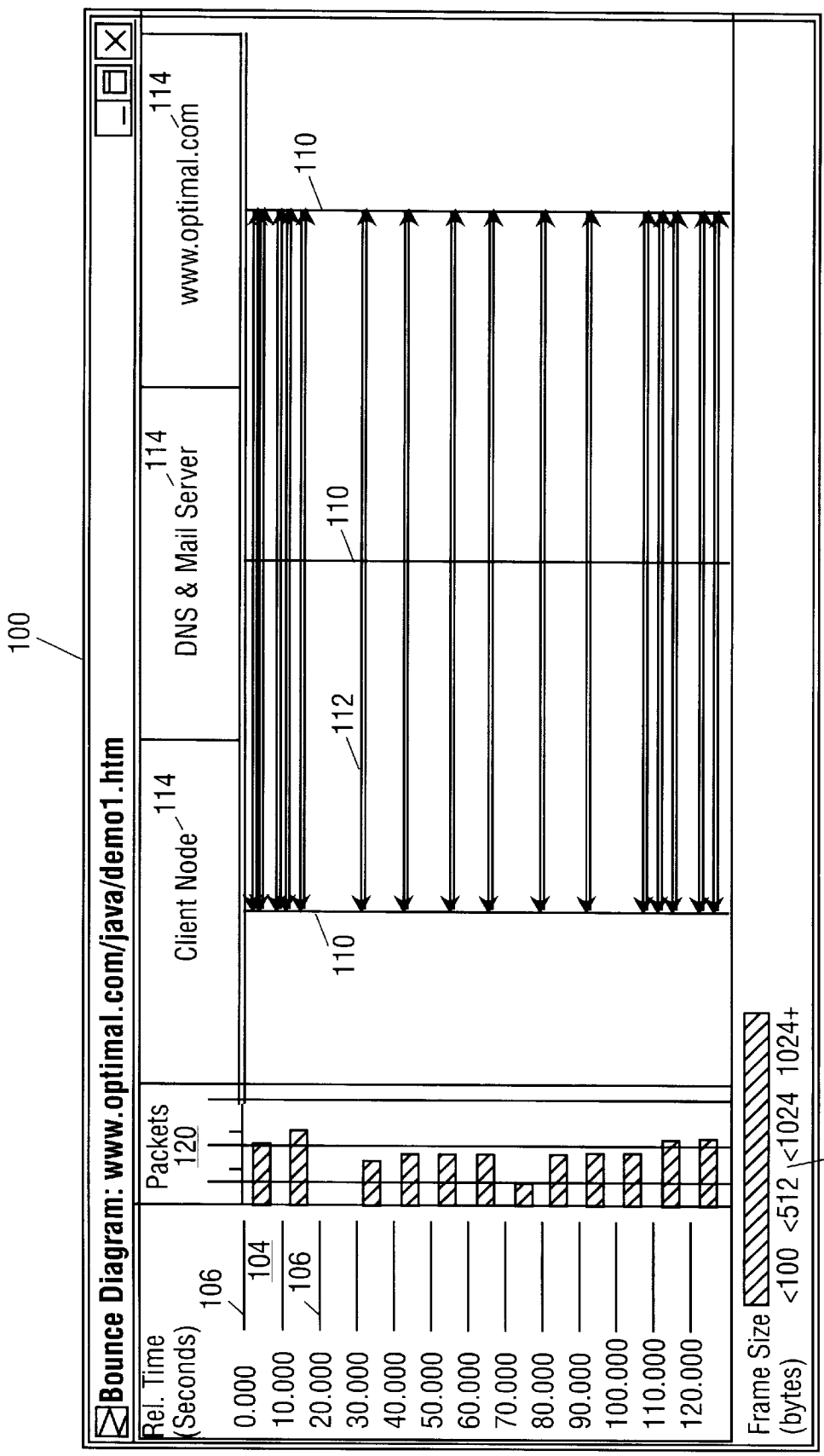
FIG. 7 is an illustration of a bounce diagram showing periodic node processing.

Another use of the bounce diagrams 100 is the identification of periodic node processing. FIG. 7 illustrates a bounce diagram 100 used for this purpose. Here, the bounce diagram 100 is sparsely populated with packet arrows 112, with packets being transmitted between the nodes on a regular, periodic basis. The bounce diagram 100 shows a number of short bursts of network activity, each separated by an idle period that is much longer than the burst. This behavior indicates that a significant portion of the user-perceived response time for the application is caused by nodal processing.

Figure 8:
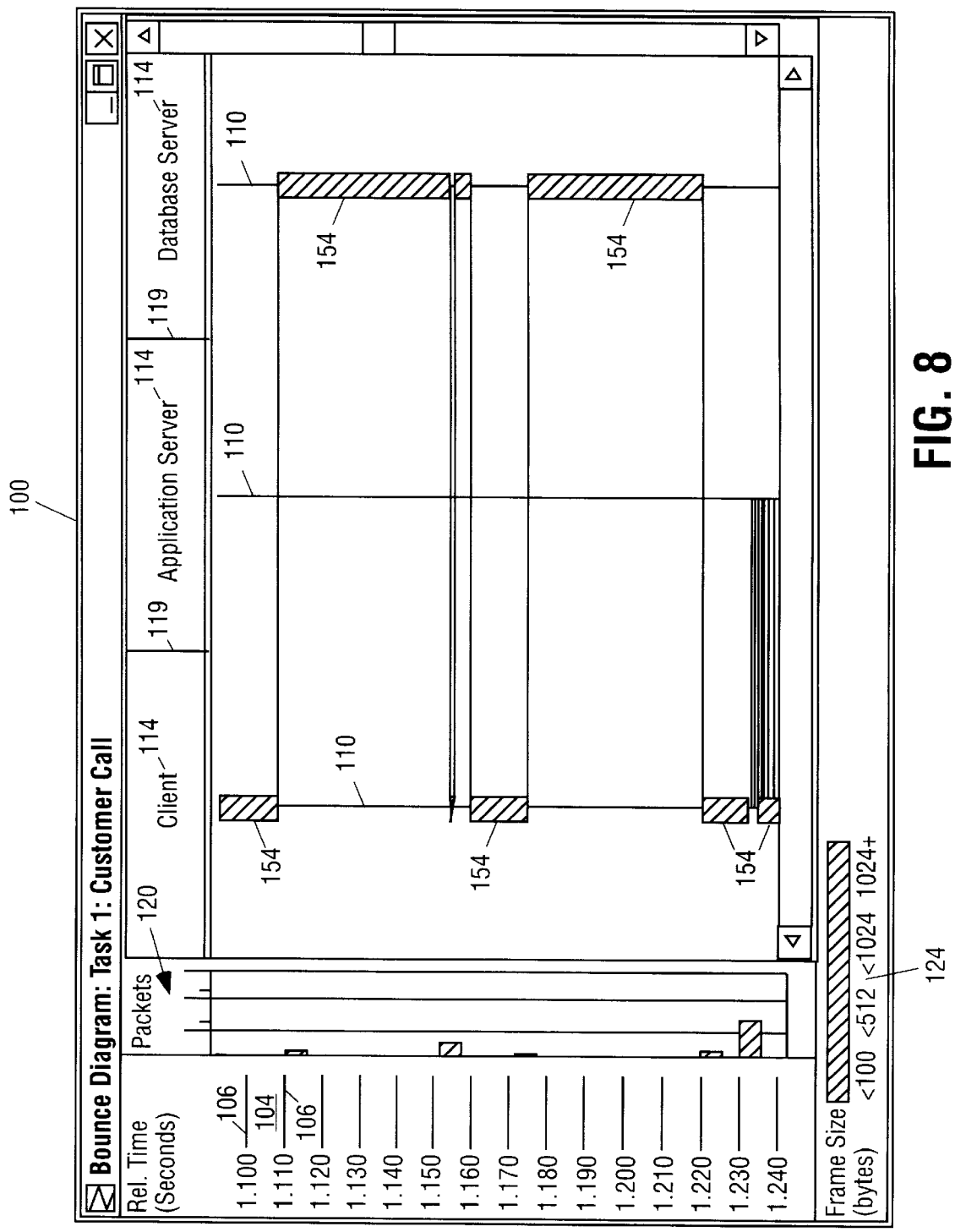
FIG. 8 is an illustration of a bounce diagram showing node processing lines.

Referring to FIG. 8 there is shown yet another use of the bounce diagrams 100. A bounce diagram 100 may be used to determine which portions of a system—a client node, the network, or a server—contribute the most to the overall response time a user experiences when using that system. FIG. 8 shows a bounce diagram 100 having node processing lines 154 drawn along portions of the node lines 110. For each node line 110, a node processing line 154 is drawn along the node line 110 for those portions of the packet trace during which the node has control of the transaction. Control by a node is defined as the time period between the time the node receives a packet until the time the node transmits a packet. During this time period, the node may be actively processing data, or may merely be idle. The node processing lines 154 thus clearly show which nodes are responsible for the overall response times. A node processing line 154 may be drawn as a wide line overlaying the node line 110, as shown, or it may be drawn in a different color. For example, in FIG. 8, a node processing line 154 is shown for the client node beginning prior to 1.1 second, and continuing through 1.11 seconds. The client node then sends a packet to the database server which is in control of the transaction between 1.11 and 1.155 seconds, as shown by its node processing line 154.

Figure 9:
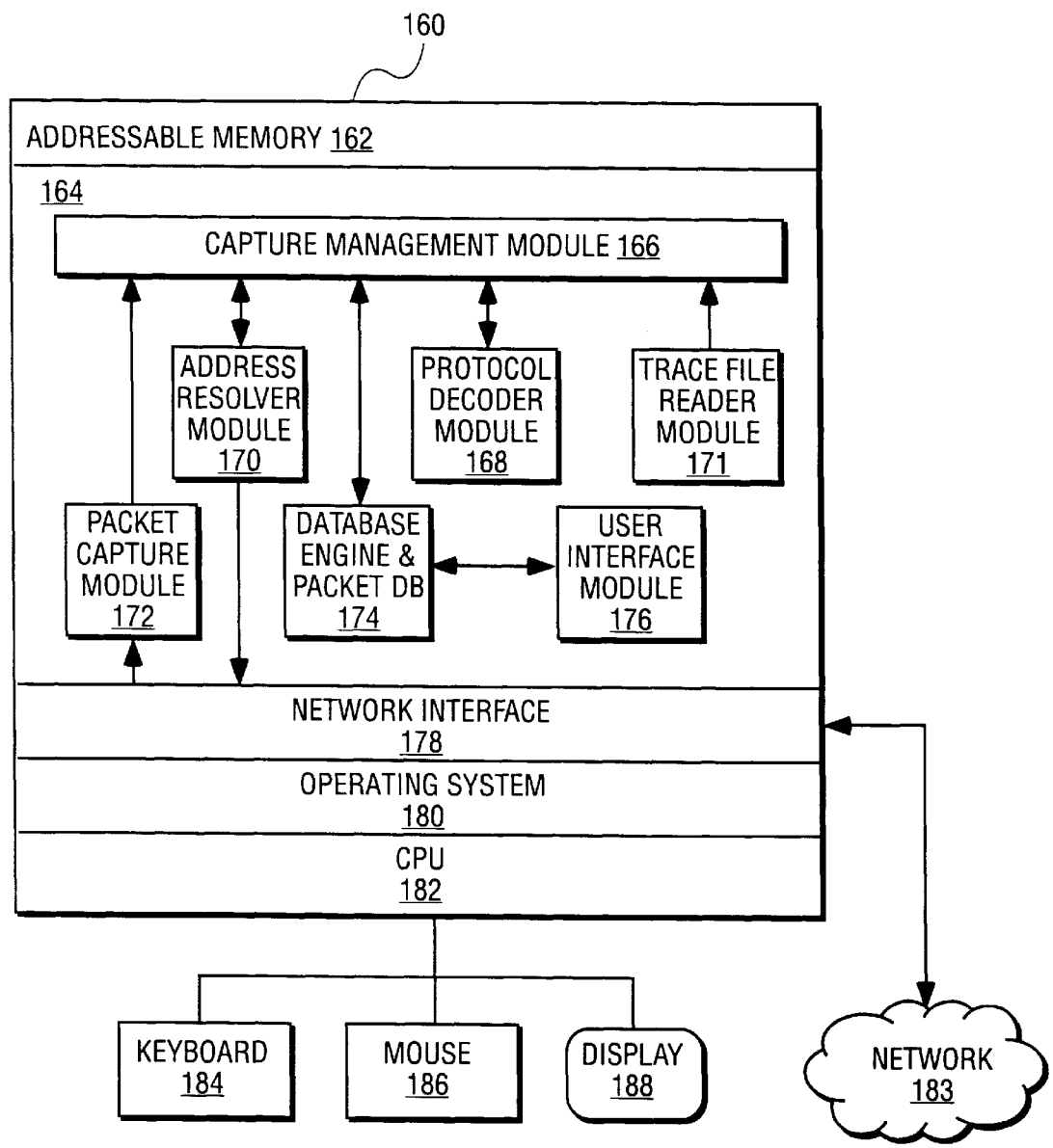
FIG. 9 is an illustration of a hardware environment for implementing the present invention.

Referring now to FIG. 9, there is shown an illustration of a hardware environment for implementing the present invention. The bounce diagram 100 is provided as a user interface of a software product 164 such as protocol analyzer, protocol decoder, or other network management tool capable of capturing packet information from a computer network 182 or reading a file containing packet information. The software product 164 which incorporates a bounce diagram 100 in accordance with the present invention executes on a conventional computer 160, including a processor 182, addressable memory 162, network interface 178, mouse 186, keyboard 184, and display monitor 188. The computer 160 executes conventional operating system 180, such as Microsoft Corp.'s Windows95™ operating system. The bounce diagram 100 is displayed in a horizontally and vertically scrollable window of the display monitor 188 using a conventional windowing technology.

In the preferred embodiment, the software product 164 is a protocol analyzer, and includes a capture management module 166, a protocol decoder module 168, an address resolver module 170, a trace file reader module 171, a packet capture module 172, a database engine and packet database 184, and a user interface module 176.

The packet capture module 172 interfaces with the network interface 178 (such as a network interface card) to read packet data from the network 183. The packet data is provided to the capture management module 166, which stores the packet to the packet database via the database engine 174. Packet data may also be obtained by the capture management module 166 from the trace file reader module 171 which reads Sniffer™, and LANalyzer™, and the like, formatted packet trace files, and extracts the packet data for storage to the database 174. The capture management module 166 uses the protocol decoder module 168 to perform protocol decodes on packets; the protocol decode information is also stored with each packet in the database 174. The address resolver module 170 is used by the capture management module to resolve node addresses into meaningful names via communication with a domain name server. These names are also stored with the packets into the database 174, and used in the bounce diagrams 100 as the node labels 114.

The user interface module 176 is responsible for displaying packet data in the form of the bounce diagram 100, and responding to user inputs for zooming, detail packet information, and switching between a bounce diagram 100 and a packet trace table. The user interface module 176 communicates with the packet database 174 to obtain packet data for rendering into the bounce diagrams 100.

Figure 10:
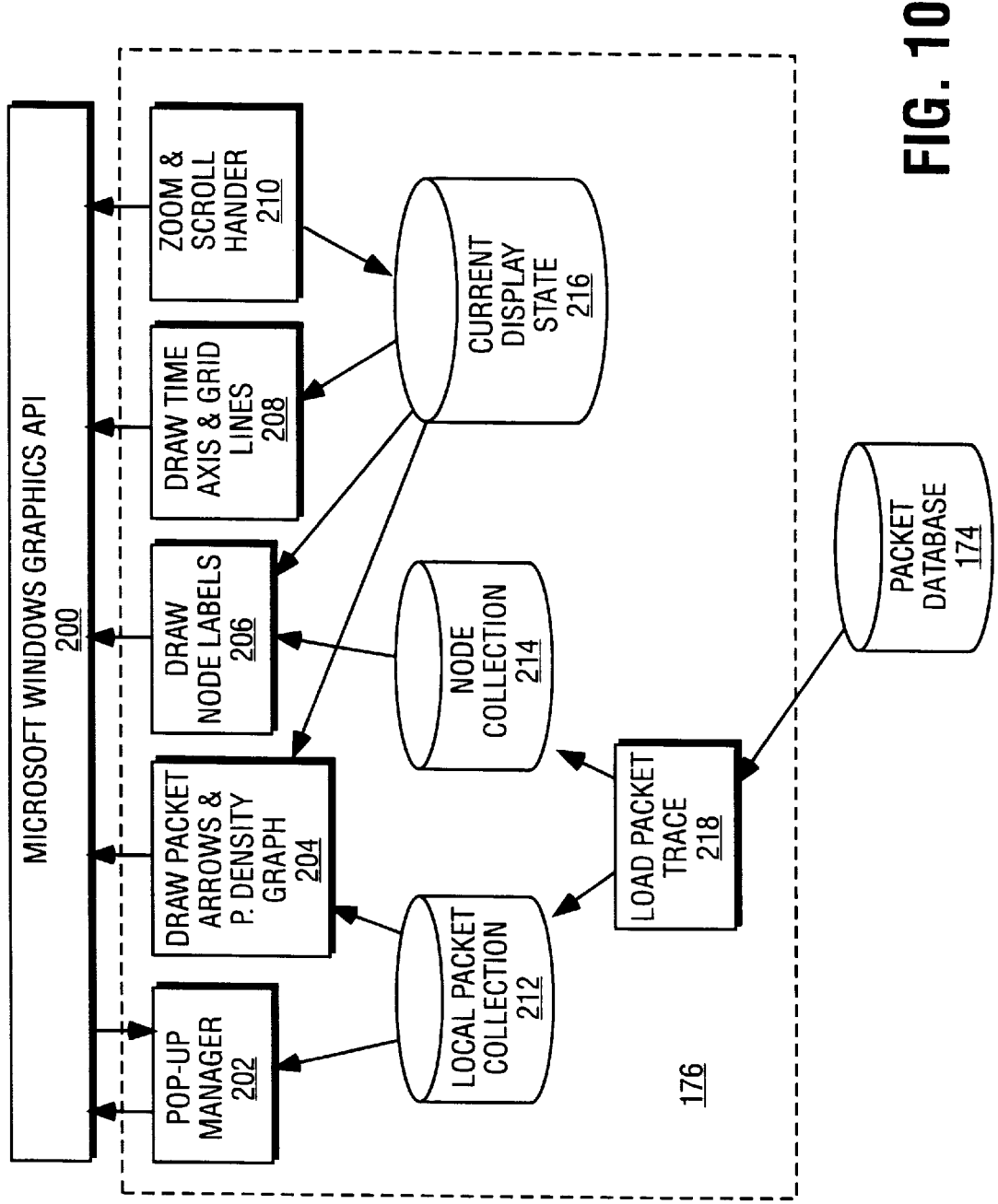
FIG. 10 is an illustration of a functional model of a user interface module for implementing the present invention.

Referring now to FIG. 10 there is shown a functional model of one implementation of user interface module 176. In this implementation for Microsoft Corp.'s Windows95 operating system, the Microsoft Windows95 graphics application programming interface 200 is used to provide an interface between the user interface module 176 and a windowing system for the computer 160. The windowing system provides graphics functions such as line and text drawing that are used to draw the bounce diagram 100, and event notifications when scrollbars are manipulated, the mouse is moved, and mouse buttons are pressed and released within the region of the bounce diagram 100.

The user interface module 176 includes a Pop-Up Manager 202, a Draw Packet Arrows module 204, a Draw Node Labels module 206, a Draw Time Axis & Grid Lines module 208, a Zoom & Scroll Handler module 210, and a Load Packet Trace module 218. Data sources include a Local Packet Collection 212 for packets used in the packet trace being displayed, a Node Collection 214 of nodes extracted from the packet trace, and current display state variables 216.

The user interface module 176 operates in the following manner. When a new bounce diagram 100 is to be drawn, the Load Packet Trace module 218 retrieves the packet trace from the packet database 174. In doing so, it stores the list of packets and certain attributes of each (relative time, packet length in bytes, source node, source port, destination node, destination port, and protocol decode) into the Local Packet Collection 212. The Load Packet Trace module 218 also stores a list of nodes that are referenced in the packet trace into the Node Collection 214. Each node in the Node Collection 214 is associated with an X screen location value that defines the horizontal position of its node line 110.

At any time the bounce diagram 100 is to be drawn (including the first time a bounce diagram 100 is drawn, and any redrawing due to scrolling or zooming), a series of operations occur. The Draw Packet Arrows module 204, the Draw Node Labels module 206, and Draw Time Axis & Grid Lines module 208 each cause their portions of the bounce diagram 100 to be drawn on the display monitor 188. Each of these modules references certain display state variables that are represented by the Current Display State Variables 216. Those display variables include the starting and ending times that should be displayed on the time axis 102, as well as the position of the horizontal scroll bar 115 if all node labels 114 cannot fit within the window.

The Draw Packet Arrows module 204 operates as follows: First, the module determines the first and last packets that are within the visible time period within the window, dependent on the lowest and highest times in the displayed region. For each packet within the visible time period, the module draws a packet arrow 112 between the source node line 110 and the destination node line 110 for the packet. The end points of the packet arrows 112 are defined by the X screen locations for the node lines 110 in the Node Collection 214, and Y screen locations computed from the time data for the packet from the Local Packet Collection 212. The color of the packet arrow 112 is determined based on the packet size.

To display the detail window 130, the Pop-up Manager 202 receives event notifications from the Windows API 200 when the user positions and moves the mouse cursor within the bounce diagram 110. The Pop-up Manager 202 periodically determines if the mouse cursor is held in a steady location over a packet arrow 112. When it detects this case, it retrieves detailed packet information from the Local Packet Collection 212 and causes a pop-up window 130 to be displayed that contains the detailed information for the appropriate packet. At that point the Pop-up Manager 202 waits for notification from the Windows API 200 that the mouse cursor has moved and then removes the pop-up window 130 from the display monitor 188.

For zooming and scrolling, the Zoom & Scroll Handler module 210 receives notification from the Windows API 200 when a scrollbar 115, 117 in the window has been moved and when the user drags the mouse cursor through a region in the bounce diagram 100. In both instances, the Zoom & Scroll Handler module 210 modifies the Current Display State Variables 216 to reflect the portion of the bounce diagram 100 that should be displayed given either the scrolling, or the selection area to be zoomed. When an area is selected for zooming, the Zoom & Scroll Handler module 210 determines the new starting and ending times for the visible portion of the time axis 102 and updates the Current Display State Variables 216 accordingly. The Zoom & Scroll Handler module 210 then causes the three Draw modules 204, 206, 208 to execute.

I claim:

1. A computer implemented method of displaying network communication over a network including a plurality of nodes, the method comprising:

capturing packet trace data for a plurality of packets, the packet trace data recording, for a first packet of the plurality of packets, a source node and a destination node, and a transmission time at which the first packet was transmitted from the source node to the destination node;

automatically displaying, on a computer display monitor, a time axis representative of a plurality of time intervals;

automatically displaying, on a computer display monitor, source and destination node lines, each of the source and destination node lines being parallel to the time axis; and automatically displaying, on a computer display monitor, for the first packet of the plurality of packets, a packet arrow associated with the first packet, the packet arrow extending from the source node line associated with the source node of the first packet to the destination node line associated with the destination node of the first packet, the packet arrow positioned on the source node line with respect to the time axis at the transmission time at which the first packet was transmitted by the source node, wherein the captured packet trace data records the source node, the destination node, and the transmission time for an actual transmission of the first packet over the network.

2. The method of claim 1, further comprising:

displaying the packet arrow in a color indicative of a size of the first packet.

3. The method of claim 1, wherein the time axis includes a plurality of time intervals, the method further comprising:

displaying a packet density graph indicating a volume of packets of the plurality of packets transmitted in a first time interval of the time plurality of intervals.

4. The method of claim 3, further comprising:

displaying the packet density graph in a color coded manner to represent an average size of packets transmitted within the first time interval.

5. The method of claim 1, further comprising:

responsive to a user selection of the packet arrow, displaying detailed information for the first packet associated with the packet arrow, the detailed information including a size of the first packet, a source node name or address, and a destination node name or address.

6. The method of claim 1, further comprising:

responsive to a user selection of an area between a starting time and an ending time, automatically redisplaying a visible portion of the time axis to correspond to the starting and ending times, and redisplaying packet arrows only for those packets of the plurality of packets transmitted between the starting and ending times.

7. The method of claim 1, further comprising:

displaying at last one node processing line drawn along a portion of the destination node line between a receive time at which the destination node associated with the destination node line received the first packet and a further transmission time at which the node transmitted a second packet, to show a time period during which the destination node processed data or was idle.

8. A system to display network communications over a network including a plurality of nodes, the system including:

a capture module to capture packet trace data for a plurality of packets, the packet trace data recording, for a first packet of the plurality of packets, a source node, a destination node and a transmission time which the first packet was transmitted from the source node to the destination node; and a user interface module to display a time axis representative of a plurality of time intervals, to display source and node destination lines associated with the source and destination nodes respectively, each of the source and destination node lines being parallel to the time axis, and to display, for the first packet of the plurality of packets, a packet arrow that extends from the source node line to the destination node line, the packet arrow being positioned on the source node line with respect to the time axis at the transmission time at which the first packet was transmitted by the source node, wherein the capture module captures the packet trace data to record the source node, the destination node and the transmission time for an actual transmission of the first packet over the network.

9. The system of claim 8 wherein the user interface module is to display the packet arrow in a color indicative of a size of the first packet.

10. The system of claim 8 wherein the user interface module is to display a packet density graph indicating a volume of packets of the plurality of packets transmitted during a first time interval of the plurality of time intervals.

11. The system of claim 10 wherein the packet density graph is color coded to represent an average size of packets transmitted within the first time interval.

12. The system of claim 8 wherein the user interface module, responsive to user selection of the packet arrow, is to display detailed information regarding the first packet associated with the packet arrow, the detailed information including a size of the first packet, a source node name or address, and a destination node name or address.

13. The system of claim 8 wherein the user interface module, responsive to a user selection of an area between a starting time and an ending time, is to automatically redisplay a visible portion of the time axis to correspond to the starting and ending times, and to redisplay packet arrows only for those packets of the plurality of packets transmitted between the starting and ending times.

14. The system of claim 8 wherein the user interface module is to display at least one node processing line drawn along a portion of the destination node line between a receive time, at which the destination node associated with the destination node line received the first packet and a further transmission time, at which the destination node transmitted a second packet, thereby to show a time period during which the destination node processed data associated with the first packet.

15. A system to display network communications over a network including a plurality of nodes, the system comprising:

first means for capturing packet trace data for a plurality of packets, the packet trace data recording, for a first packet of the plurality of packets, a source node, a destination node, and a transmission time at which the first packet was transmitted from the source node to the destination node; and second means for displaying a time axis representative of a plurality of time intervals, for displaying source and destination node lines associated with source and destination nodes respectively, the source and destination node lines being parallel to the time axis, and for displaying, for the first packet, a packet arrow extending from the source node line to the destination node line, the packet arrow further being positioned on the source node line with respect to the time axis at the transmission time at which the first packet was transmitted by the source node, wherein the first means captures the packet trace data to record the source node, the destination node, and the transmission time for an actual transmission of the first packet over the network.

16. A computer-readable medium storing a sequence of instructions that, when executed by a computer, cause the computer to:

capture packet trace data for a plurality of packets, the packet trace data recording for a first packet of the plurality of packets, a source node and a destination node, and a time of which the first packet was transmitted from the source node to the destination node;

automatically display, on a computer display monitor, a time axis representative of a plurality of time intervals;

automatically display, on a computer display monitor, source and destination node lines, each of the source and destination node lines being parallel to the time axis; and automatically display, on a computer display monitor, for the first packet of the plurality of packets, a packet arrow associated with the first packet, the packet arrow extending from the source node line associated with the source node of the first packet to the destination node line associated with the destination node of the first packet, the packet arrow positioned on the source node line with respect to the time axis at the transmission time at which the first packet was transmitted by the source node, wherein the captured packet trace data records the source node, the destination node, and the transmission time for an actual transmission of the first packet over the network.

* * * * *